(12) United States Patent
Harada

(10) Patent No.: US 6,416,681 B1
(45) Date of Patent: Jul. 9, 2002

(54) GRANULE FOR FORMING FERRITE BODY, FERRITE SINTERED PRODUCT AND PRODUCTION METHOD THEREOF

(75) Inventor: Hiroshi Harada, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/644,217

(22) Filed: Aug. 23, 2000

(30) Foreign Application Priority Data

Aug. 24, 1999 (JP) ............................................. 11-236463
Jun. 22, 2000 (JP) ........................................ 2000-187365

(51) Int. Cl.$^7$ .................. C04B 35/622; B28B 13/10
(52) U.S. Cl. ................. 252/62.54; 252/62.56; 252/62.57; 252/62.58; 252/62.59; 252/62.6; 252/62.61; 252/62.62; 252/62.63; 252/62.64
(58) Field of Search ............... 252/62.54, 62.56, 252/62.57, 62.58, 62.59, 62.6, 62.62, 62.61, 62.63, 62.64

(56) References Cited

U.S. PATENT DOCUMENTS 3,860,524 A * 1/1975 Goldman ............... 252/62.62

FOREIGN PATENT DOCUMENTS

| JP | 3-031660 | 5/1991 |
| JP | 5-159918 | 6/1993 |
| JP | 6-289225 | * 10/1994 |
| JP | 7-017460 | 3/1995 |
| JP | 10-059776 | 3/1998 |

* cited by examiner

Primary Examiner—C. Melissa Koslow
(74) Attorney, Agent, or Firm—Oblon, Spivak, McClelland, Maier & Neustadt, P.C.

(57) ABSTRACT

Granule for forming ferrite is provided by mixing powders of ferrite raw material, polyvinyl alcohol as a binder and polyethylene glycol added as plasticizer and having molecular weight being 1000 to 6000, and forming granules.

15 Claims, 9 Drawing Sheets

FIG. 1

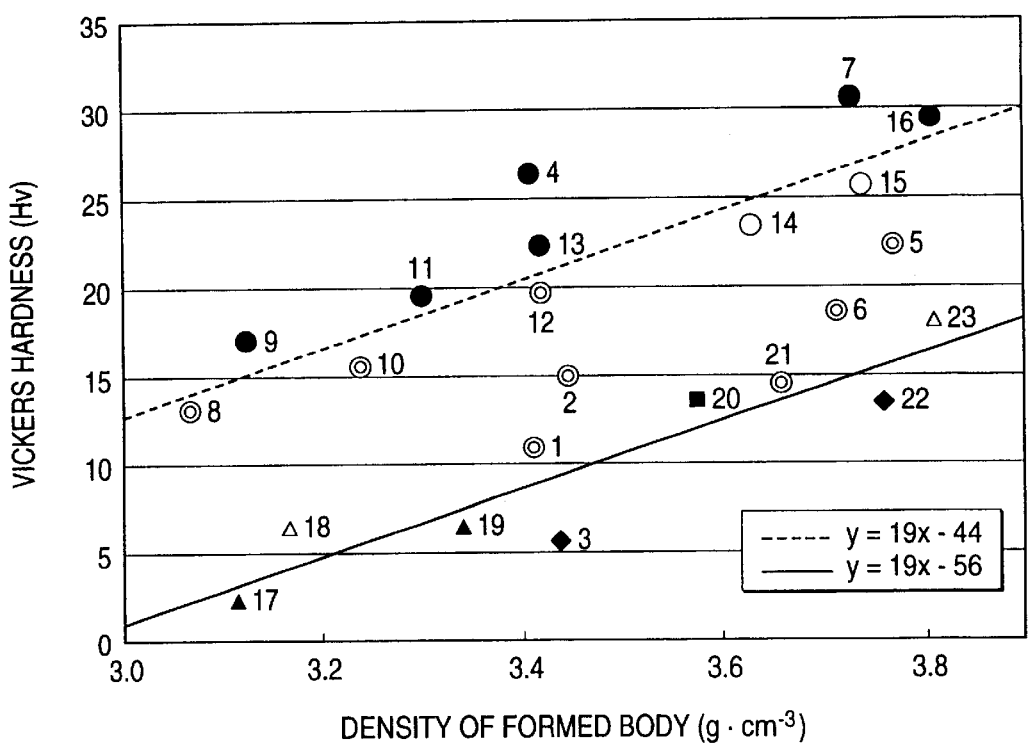

◎ WORKABILITY LEVEL 1
(CONTINUOUS GRINDING: 200000 PIECES, DEFECT: NON, BREAKAGE: NON)
○ WORKABILITY LEVEL 2
(CONTINUOUS GRINDING: 100000 PIECES, DEFECT: NON, BREAKAGE: NON)
△ WORKABILITY LEVEL 3
(CONTINUOUS GRINDING: 100000 PIECES, DEFECT: NON,
BREAKAGE: 1 TO 20 PIECES)
● WORKABILITY LEVEL 4
(CONTINUOUS GRINDING: 30000 PIECES, DEFECT: PRESENT, BREAKAGE: NON)
▲ WORKABILITY LEVEL 5
(CONTINUOUS GRINDING: 100000 PIECES, DEFECT: NON,
BREAKAGE: 21 TO 50 PIECES)
■ WORKABILITY LEVEL 6
(CONTINUOUS GRINDING: 100000 PIECES,
STICKING OF GROUND POWDER DUSTS: PRESENT, BREAKAGE: 1 TO 20 PIECES)
◆ WORKABILITY LEVEL 7
(CONTINUOUS GRINDING: 100000 PIECES,
STICKING OF GROUND POWDER DUSTS: PRESENT, BREAKAGE: 21 TO 50 PIECES)

STARTING OF GRINDING

12 HRS AFTER (144000 pieces)

24 HRS AFTER (288000 pieces)

STARTING OF GRINDING

4 HRS AFTER (48000 pieces)

8 HRS AFTER (96000 pieces)

STARTING OF GRINDING

4 HRS AFTER

16 HRS AFTER

STARTING OF GRINDING

4 HRS AFTER (36000 pieces)

9 HRS AFTER (81000 pieces)

GRANULE FOR FORMING FERRITE BODY, FERRITE SINTERED PRODUCT AND PRODUCTION METHOD THEREOF

BACKGROUND OF THE INVENTION

The invention relates to ferrite sintered product obtained by forming a ferrite body using ferrite-forming granules and sintering the ferrite body, a producing method thereof and granules for forming the ferrite body. Particularly, the invention relates to granules enabling to produce ferrite formed bodies having excellent work ability and the ferrite sintered product with reduced loss of magnetic core and the method of producing the same as well as the ferrite-forming granule enabling to bring about a formed body of high density prior to the sintering.

Ferrite is broadly used to electronic parts, and the ferrite is formed with ferrite material and is obtained by baking the formed body. As methods of producing the ferrite bodies, conventionally there are employed various methods, and among them, a drying pressure forming method is generally employed. That is, the granules are effected under pressure to produce ferrite formed bodies. The granules are made as follow. For example, a water slurry is prepared with powder of ferrite raw material, a binder and a water, and the mixed material is dried by a spray dryer to make granules. Otherwise, the powder of ferrite raw material and the binder solution are agitated to mix them, and the drying and an oscillating extrusion granulation are repeated to make granules. Then, the formed bodies are baked to turn out sintered ones. Herein, the oscillating extrusion granulation method is defined as a method in that grains are granulated to be grain diameter of, for example, several mm, and crushed on meshes of a net to be fine powder, and this operation is performed in several steps of making net meshes gradually smaller, whereby particles of smaller than predetermined particle size are available.

In the pressure forming process for obtaining the formed body before the sintering, it is important to use such ferrite-forming granules of good fluidity, filling property into a mold and easy fragility with small pressure from the viewpoint of making excellent quality of ferrite sintered products and increasing productivity.

As the methods of producing granules of good fluidity and easy fragility with small pressure, JP-A-5-159918 and JP-B-7-17460 disclose methods that a slurry is prepared with a dispersing agent into granulation. Further JP-B-3-31660 and JP-A-10-59776 disclose methods that segregation of the binder is controlled for granulation.

However, the methods described in these publications are technologies to be applied to a spray-dry granulating method generally using a spray dryer, and if applying to an oscillating extrusion granulating method, desired effects could not be exhibited and have narrow usage.

In the methods in the above publications, although the fluidity and the easy fragility of granules are improved, satisfied effects could not be realized in strength of the formed body and electro-magnetic properties of the sintered product, in particular loss of magnetic cores.

[A0003]

When making complicated shapes such as coiling drum like cores or when requiring highly dimensional precision, since desired parts cannot be produced by only baking the formed bodies, therefore machining procedures such as cutting, grinding, and polishing are required. In general, by which stage of producing the ferrite products, the machining procedure is disposed, there are following methods.

(1) a method of machining a closely baked ferrite body in a predetermined dimensions or shapes, (2) a method of machining a ferrite formed body under a semi-sintered condition by baking the ferrite at lower temperature by 100 to 500° C. than temperature of making the ferrite close, that is, by baking at neighborhood temperature of starting the sintering, and (3) a method of not baking, but directly machining the ferrite formed body.

In the method (1) of machining the sintered body, since the ferrite has very high hardness in itself, the dimensional precision of the processed product is lowered, and further shocks while machining are large and pitching is easily generated.

In the method (2) of machining the half-sintered body, since the ferrite has not been made perfectly close, the hardness and anti-abrasion are low, while the workability is heightened, but since a ground of the half sintered body is still on the way of shrinkage and if a rest sintering is started after the machining is carried out under the shrinkage condition, the baking at the temperature brought under the half-sintered condition largely changes sizes. Besides, when the ferrite formed body is baked under the half-sintered condition, temperature distribution in a furnace is largely varied by disposing the places or the number of the ferrite formed bodies within the furnace, so that the dimensional precision of the ferrite formed bodies is reduced under the half-sintered condition on the way of shrinkage.

For such reasons, in general the method (3), that is, machining under not sintered condition after forming is employed for machining the ferrite formed bodies, excepting especial cases.

When the ferrite formed body is machined by the method (3), since the mechanical strength of the formed body is weaker than that of the sintered or half-sintered ferrite formed body, defects as cracks or breakage are easy to occur. Therefore, the prior art depends on such methods of rendering the ferrite formed body to be high density or drying the formed body for heightening the mechanical strength, followed by processing. However, in the ferrite formed body whose mechanical strength is heightened by such as drying, the hardness of the surface is made high, so that abrasion of a grinding disc as a diamond wheel becomes large and failures in processing are easy to happen such as defects or lowering in the precision of the faces which have been processed in a short period of time, resulting in easily generating inferior products and decreasing yield. For increasing the yield, cleanings must be frequently carried out to processing tools such as the diamond wheel, and thus problems requiring complicated maintenance are involved with the prior art.

SUMMARY OF THE INVENTION

In view of the above mentioned problems, it is accordingly object of the invention to provide granule for forming ferrite with which such ferrite formed body may be produced, making less abrasion of tools for machining the formed body and generating neither defects of the formed body nor reduction of precision in the processed face which are created by shock of the tools during processing as well as ferrite formed body therewith.

Further, it is an object of the invention to provide a molding granule enabling to bring ferrite sintered products of reduced loss of magnetic core and a method of producing the same.

The granule for forming ferrite formed body according to a first aspect of the invention is provided by mixing, for granulation, powders of ferrite raw material, polyvinyl alcohol as a binder and polyethylene glycol added as plasticizer and having molecular weight being 1000 to 6000.

The granule for forming ferrite according to a second aspect of the invention is characterized by adding 5 weight parts to 50 weight parts of polyethylene glycol with respect to 100 weight parts of polyvinyl alcohol.

The ferrite formed body according to a third aspect of the invention is provided by using granules for forming ferrite of the first aspect or the second aspect, and is characterized in that when the Vickers hardness of the formed body is Y and the density thereof is X (g·cm$^{-3}$), the relation between Y and X is $$Y=19X-A,$$

and satisfies X=3.0 to 3.9 g·cm$^{-3}$ and A=44 to 56.

A ferrite sintered product of a first aspect of the invention is characterized by sintering molded body of ferrite-forming granule composed by mixing, for granulation, powder of ferrite raw material, polyvinyl alcohol as a binder and polyethylene glycol added as a plasticizer and having molecular weight being 1000 to 6000, the ferrite sintered product being 0.2 wt % or lower in coefficient of water absorption.

A method of producing ferrite sintered product of a second aspect of the invention is characterized by mixing, for granulation, powder of ferrite raw material, polyvinyl alcohol as a binder and polyethylene glycol added as a plasticizer and having molecular weight being 1000 to 6000, forming the granules through a mold, and sintering the formed body to produce the sintered product having coefficient of water absorption being 0.2 wt % or lower.

BRIEF DESCRIPTION OF THE DRAWINGS

FIG. 1 is a graph showing the relation between the density, the Vickers hardness and the workability of formed body samples;

DETAILED DESCRIPTION OF THE PREFERRED EMBODIMENTS

Figure 2A:
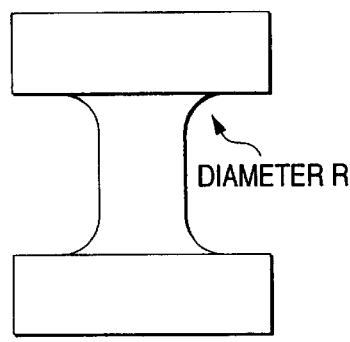
FIG. 2A is a side view-of a drum like core processed in the mode for carrying out the invention.

Raw material powders of granule for forming ferrite of the invention are not especially limited, but main components are, for example, $Fe_2O_3$, MgO, MnO, NiO, CuO, and ZnO, and if necessary, oxides of such as Co, W, Bi, Si, B, and Zr may be included as sub-components or unavoidable impurities.

Preferable average particle diameter of ferrite raw material powder is 0.01 to 5 μm, more preferable is 0.1 to 1.5 μm. For making the preferable average particle diameter, a process therefor may depend on a crushing system such as a ball mill, agitating mill or attritor, or either of a wet- or dry-crushing.

The polyvinyl alcohol as a first necessary component serves as a binder of a primary particle, that is, a binding material of raw material powder—raw material powder, and the polyvinyl alcohol may be employed from known ones by appropriately selecting degree of saponification or degree of polymerization. The addition amount of polyvinyl alcohol is ordinarily 0.2 to 10 weight parts to 100 weight parts of the raw material powder and more preferably 0.5 to 3 weight parts. If the addition amount of polyvinyl alcohol is less than 0.2 weight parts, it is not good, since ferrite particle cannot be granulated. Reversely, if exceeding 10 weight parts, ferrite granule is too hard, and it is not easily crushed, whereby granular boundary much remains to cause bad formation. In addition, capacity defects undesirably increase.

Polyethylene glycol as a second necessary component serves as a plasticizer in the granule for forming ferrite formed body and moderately reduces the hardness of the surface thereof to improve workability, and a fragility with low pressure and a pressure delivering property. Thus, interspaces among the granules are reduced. The molecular weight of polyethylene glycol is preferably 1000 to 6000, more preferably 2000 to 4000. When the molecular weight of the polyethylene glycol is less than 1000, the surface hardness and the fragility with low pressure of the formed body are improved by adding polyethylene glycol, but, due to a large hygroscopic property, powders such as ground powder dusts created during processing with processing tools such as grinding discs, drills, bits and diamond wheels stick to processing tools and decrease the workability. Further, the fluidity of granule is lowered and an even filling into the mold cannot be provided. On the other hand, when the molecular weight of the polyethylene glycol is more than 6000 the surface hardness and the fragility with low pressure of the formed body is scarcely improved by the addition of the polyethylene glycol, and cracks easily occur lowering the strength of the formed body.

The granule for forming ferrite according to the invention is obtained by granulating ferrite powder by a conventionally known method, for example, an atomizing granulating method through a spray dryer, an oscillating extrusion granulating method or others. Average particle diameters of the thus obtained ferrite granule are usually 50 to 500 μm, preferably 70 to 300 μm, more preferably 80 to 150 μm. If the average particle diameter is less than 50 μm, fluidity and filling into a metal mold become worse, so that dispersion in sizes of the formed bodies and single weight are large. Further, fine powders easily stick to the metal mold. Reversely if the average particle diameter exceeds 500 μm, interspaces among granules much remains to cause failure forming. The dispersion in sizes of the formed bodies and single weight are large. In particular, in the formed body of the diameter being 2 mm or lower, the dispersion is large and not preferable.

For producing the ferrite formed product having the high density according to the invention, the ferrite-forming granule is subjected to a dry-pressure forming through the mold. In this case, the pressing pressure usually ranges 40 to 500 MPa, preferably 80 to 400 MPa.

In the ferrite-forming granule according to the invention if the addition amount of polyethylene glycol exceeds 50 wt parts with respect to 100 wt parts of polyvinyl alcohol, cracks easily occur by lowering of the strength of the formed body. If being less than 5 wt parts, the improvement of the surface hardness of the formed body and the easy fragility with low pressure by the addition thereof is insufficient. The addition amount of polyethylene glycol to polyvinyl alcohol is more preferably 20 to 40 wt parts.

The ferrite formed body according to the invention is provided by using granules for forming ferrite of the first aspect or the second aspect, and is characterized in that when the Vickers hardness of the formed body is Y and the density thereof is X (g·cm$^{-3}$), the relation between Y and X is $$Y=19X-A,$$

and satisfies X=3.0 to 3.9 g·cm$^{-3}$ and A=44 to 56.

If the relation between the Vickers hardness Y and the density X of the formed body falls within the range satisfying the above mentioned relation, it is possible to make sticking of ground powder dusts or generation of defects or breakage none or lesser in continuously grinding, for example, 100000 or 200000 pieces by the diamond wheel. If the Vickers hardness is of smaller value than the relation of the above formula in the relation with the density, sticking of ground powder dusts by grinding or breakage easily happen, and reversely if the Vickers hardness is of larger value than the relation of the above formula in the relation with the density, defects by grinding easily happen.

agitation and granulation by the agitation granulating machine TM mixer (made by Mitsui Mining Co., Ltd.), and were adjusted in granulated powder.

In Table 1, with respect to PVA water solutions Nos. 5 and 6, 66 wt parts of Ni—Cu—Zn based ferrite powder, 28 wt parts of water, 6 wt parts of polyvinyl alcohol water solution added with polyethylene glycol of solid density being 12 wt %, and 0.25 wt parts of polycarboxylic acid ammonium salt were wet-pulverized and mixed, and a ferrite slurry was adjusted. PVA water solution No. 7 was adjusted in the same ways as PVA water solutions Nos. 5 and 6, excepting that polyethylene glycol was not added.

Herein, as shown in Table 1, the used polyvinyl alcohols were of saponification degree of 98.5 and weight degree of 2400 (PVA water solutions Nos. 1 to 4, 8 to 13 and 17to 20), saponification degree of 88.0 and weight degree of 500 (PVA water solutions Nos. 5 to 7), and saponification degree of 88.0 and weight degree of 1700 (PVA water solutions Nos. 14 to 16, 21 to 23).

The used polyethylene glycols were molecular weight of 600 (PVA water solutions Nos. 3, 20 and 22), molecular weight of 1000 (PVA water solutions Nos. 12 to 14, 23), molecular weight 2000 (PVA water solutions Nos. 1, 6, 8, 15 to 18, 21),F molecular weight 4000 (PVA water solutions Nos. 2, 5, 9, 19), molecular. weight 6000 (PVA water solutions No. 10), and molecular weight 10000 (PVA water solution No. 11). The addition amounts of polyethylene glycol to 100 wt parts of polyvinyl alcohol were changed as shown at the right column of Table 1.

TABLE 1

| PVA solution No. | Density of solid content (Wt %) | Polyvinyl alcohol | | | Polyethylene glycol | |
|---|---|---|---|---|---|---|
| | | Saponification degree | Polymerization degree | Addition amount (Wt part) | Molecular amount | Addition amount (Wt part) |
| 1 | 6 | 98.5 | 2400 | 100 | 2000 | 30 |
| 2 | 6 | 98.5 | 2400 | 100 | 4000 | 25 |
| 3 | 6 | 98.5 | 2400 | 100 | 600 | 40 |
| 4 | 6 | 98.5 | 2400 | 100 | — | 0 |
| 5 | 12 | 88.0 | 500 | 100 | 4000 | 20 |
| 6 | 12 | 88.0 | 500 | 100 | 2000 | 25 |
| 7 | 12 | 88.0 | 500 | 100 | — | 0 |
| 8 | 6 | 98.5 | 2400 | 100 | 2000 | 5 |
| 9 | 6 | 98.5 | 2400 | 100 | 4000 | 3 |
| 10 | 6 | 98.5 | 2400 | 100 | 6000 | 10 |
| 11 | 6 | 98.5 | 2400 | 100 | 10000 | 25 |
| 12 | 6 | 98.5 | 2400 | 100 | 1000 | 10 |
| 13 | 6 | 98.5 | 2400 | 100 | 1000 | 2 |
| 14 | 6 | 88.0 | 1700 | 100 | 1000 | 12 |
| 15 | 6 | 88.0 | 1700 | 100 | 2000 | 10 |
| 16 | 6 | 88.0 | 1700 | 100 | 2000 | 3 |
| 17 | 6 | 98.5 | 2400 | 100 | 2000 | 60 |
| 18 | 6 | 98.5 | 2400 | 100 | 2000 | 50 |
| 19 | 6 | 98.5 | 2400 | 100 | 4000 | 60 |
| 20 | 6 | 98.5 | 2400 | 100 | 600 | 25 |
| 21 | 6 | 88.0 | 1700 | 100 | 2000 | 45 |
| 22 | 6 | 88.0 | 1700 | 100 | 600 | 50 |
| 23 | 6 | 88.0 | 1700 | 100 | 1000 | 50 |

Preferred embodiments of the present invention will be explained hereinafter.

In Table 1, with respect to others than PVA water solutions Nos. 5 to 7, 100 wt parts of Ni—Cu—Zn based ferrite powder were added with 17 wt parts of various polyvinyl alcohol water solutions added with polyethylene glycol or not added therewith, and were carried out with mixture, With respect to PVA water solutions Nos. 1 to 4 and 8 to 23, as shown in Table 2, granulated powders were dried by a belt dryer, extruded by an oscillating granulate cracking machine, and regulated by a shifter, and thus granulates of average particle diameter being 200 μm were obtained. In PVA water solutions Nos. 5 to 7, granulates were produced by a spray granulating machine, and globule granulates of average diameter were 125 μm.

TABLE 2

| PVA solution No. | Granulating methods | Sizes of formed ones (mm) Diameter sizes | Sizes of length L | Levels of processability |
|---|---|---|---|---|
| 1 | Oscillating extrusion granulation | 3.0 | 2.5 | ⊙ |
| 2 | Oscillating extrusion granulation | 3.0 | 2.5 | ⊙ |
| 3 | Oscillating extrusion granulation | 3.0 | 2.5 | ♦ |
| 4 | Oscillating extrusion granulation | 3.0 | 2.5 | ● |
| 5 | Spray atomizating granulation | 1.3 | 1.5 | ⊙ |
| 6 | Spray atomizating granulation | 1.3 | 1.5 | ⊙ |
| 7 | Spray atomizating granulation | 1.3 | 1.5 | ● |
| 8 | Oscillating extrusion granulation | 4.0 | 3.0 | ⊙ |
| 9 | Oscillating extrusion granulation | 4.0 | 3.0 | ● |
| 10 | Oscillating extrusion granulation | 4.0 | 3.0 | ⊙ |
| 11 | Oscillating extrusion granulation | 3.0 | 2.5 | ● |
| 12 | Oscillating extrusion granulation | 3.0 | 2.5 | ⊙ |
| 13 | Oscillating extrusion granulation | 3.0 | 2.5 | ● |
| 14 | Oscillating extrusion granulation | 1.5 | 1.8 | ○ |
| 15 | Oscillating extrusion granulation | 1.5 | 1.8 | ○ |
| 16 | Oscillating extrusion granulation | 1.5 | 1.8 | ● |
| 17 | Oscillating extrusion granulation | 4.0 | 3.0 | ▲ |
| 18 | Oscillating extrusion granulation | 4.0 | 3.0 | △ |
| 19 | Oscillating extrusion granulation | 3.0 | 2.5 | ▲ |
| 20 | Oscillating extrusion granulation | 1.5 | 1.8 | ■ |
| 21 | Oscillating extrusion granulation | 1.5 | 1.8 | ⊙ |
| 22 | Oscillating extrusion granulation | 1.5 | 1.8 | ♦ |
| 23 | Oscillating extrusion granulation | 1.5 | 1.8 | △ |

⊙ Workability level 1 (Continuous grinding: 200000 pieces, Defect: Non, Breakage: Non)
○ Workability level 2 (Continuous grinding: 100000 pieces, Defect: Non, Breakage: Non)
△ Workability level 3 (Continuous grinding 100000 pieces, Defect: Non, Breakage: 1 to 20 pieces)
● Workability level 4 (Continuous grinding: 30000 pieces, Defects: present, Breakage: Non)
▲ Workability level 5 (Continuous grinding: 100000 pieces, Defect: Non, Breakage: 21 to 50 pieces)
■ Workability level 6 (Continuous grinding: 100000 pieces, Sticking of ground powder dusts: Present, Breakage: 1 to 20 pieces)
♦ Workability level 7 (Continuous grinding: 100000 pieces, Sticking of ground powder dusts: Present, Breakage: 21 to 50 pieces)

The continuous forming was performed on column shaped cores of diameter being 3.0 mm and length (L) being 2.5 mm (PVA water solutions Nos. 1 to 4, 11 to 13, 19), column shaped cores of diameter being 1.3 mm and length being 1.5 mm (PVA water solutions Nos. 5 to 7), column shaped cores of diameter being 4.0 mm and length being 3.0 mm (PVA water solutions Nos. 8 to 10, 17, 18), and column shaped cores of diameter being 1.5 mm and length being 1.8 mm (PVA water solutions Nos. 14 to 16, 20 to 23).

FIG. 1 shows the relation between the Vickers hardness Hv of the formed body, the density of the same and the workability level. The Vickers hardness was measured at load of 100 gf (PVA solutions Nos. 1 to 4 and 8 to 23) or at load of 300 gf (PVA solutions Nos. 5 to 7) by means of Shimazu Micro Hardness Meter HMV-2000 Type.

Next, the obtained formed bodies were ground by the diamond wheel to produce coiling drum like cores as shown in FIG. 2A, and evaluated with respect to a depressed condition of an inner brim of the formed body, increase of a middle diameter R of the processed core, appearance of broken core, and sticking of ground powder dusts. The processing apparatus by the diamond wheel is that lots of column bodies are set at the outer circumference thereof, and both ends of the column bodies are rotatably set such that shafts of the column bodies are parallel to a center shaft of a disc, and as rotating the disc the column bodies are contacted to the cutting faces of the diamond wheel rotating at high speed so as to cut grooves in circumferential direction of the column bodies for producing the drum like cores as shown in FIG. 2A.

Figure 2B:
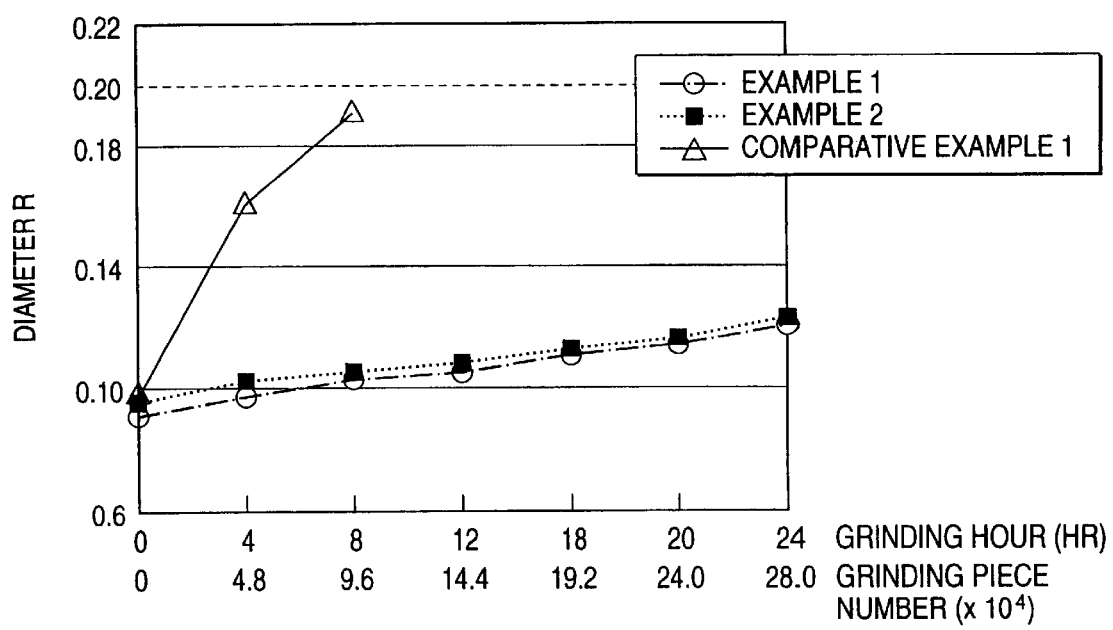
FIG. 2B is a view showing the relation between the processing time of the core and the middle diameter R with reference to Example and Comparative example.

FIG. 2B graphs the grinding times (hr) of the diamond wheel for the formed bodies of granules, respectively using PVA water solution No. 1 (shown as Example 1), PVA water solution No. 2 (shown as Example 2) and PVA water solution No. 4 (shown as Comparative example 1) and the increases of the middle diameter R shown in FIG. 2A after grinding with respect to the grinding piece number ($\times 10^4$ pieces). When using Examples 1 and 2, that is, the polyvinyl alcohol water solution containing polyethylene glycol of molecular weight being 2000 or 4000, though using the diamond wheel ground for 24 hours, the middle diameter R increased by around R=0.13 mm being far smaller than an upper limit of R=0.20 mm as a practical middle diameter. On the other hand, in the Comparative example 1, that is, in the formed bodies not containing polyethylene glycol, the middle diameter R reached almost the upper limit of R=0.20 mm by grinding for 8 hours, and it was found that the abrasion of the diamond wheel easily progressed.

Figure 3A:
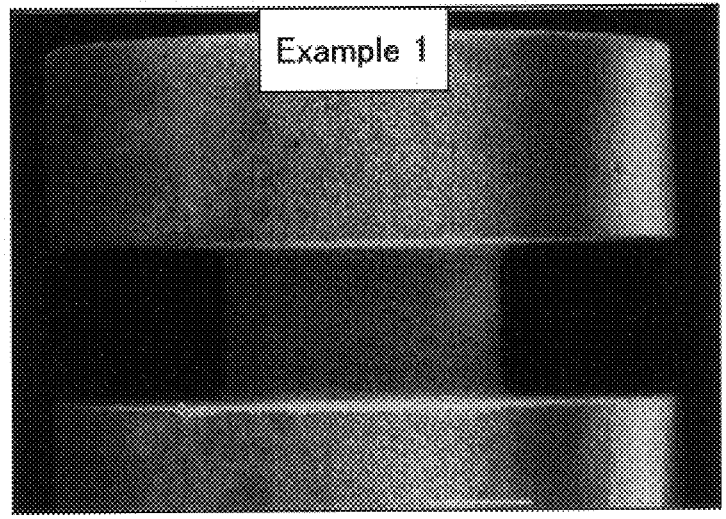
FIGS. 3A to 3C are photographs showing conditions of the drum like cores in Example 1 of the invention.
Figure 3B:
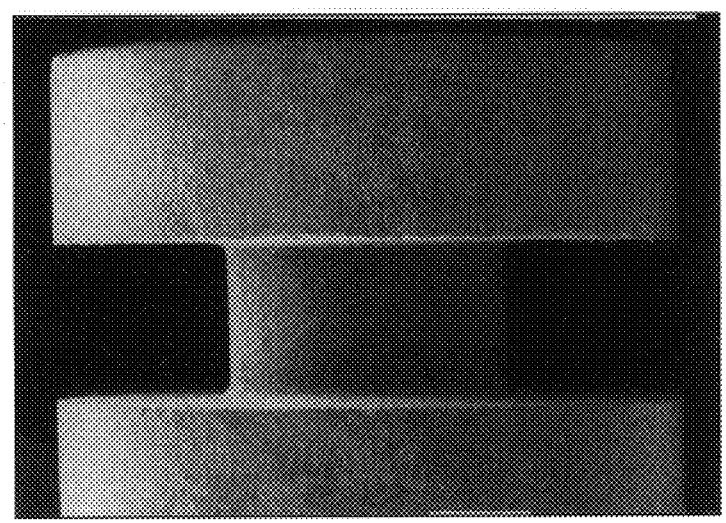
Figure 3C:
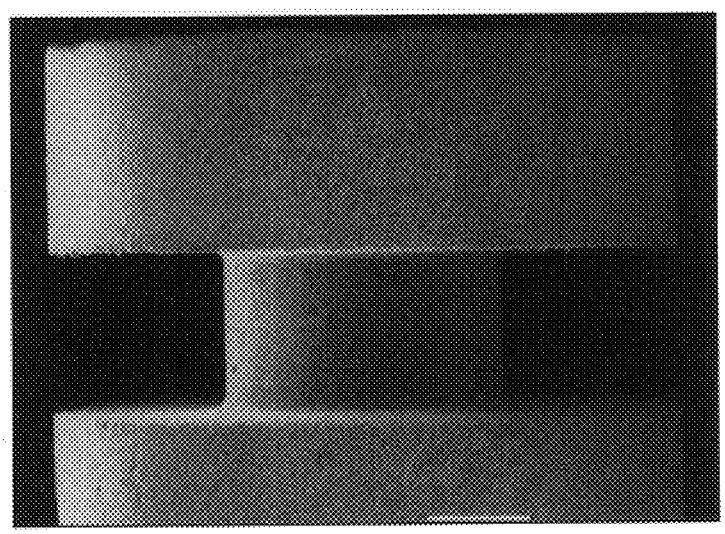

FIG. 3A, B and C are photographs showing conditions of cores by the diamond wheel of grinding the formed bodies by using Example 1 (PVA water solution No. 1) for granulation. FIG. 3A shows the core condition when starting the grinding by the diamond wheel. FIG. 3B shows the core condition after 12 hours of the continuous grinding by the diamond wheel (after continuously grinding 144000 pieces). FIG. 3C shows the core condition after 24 hours of the continuous grinding by the diamond wheel (after continuously grinding 288000 pieces). As confirming from these photographs, according to Example 1, such drum like cores without defects in the inner brims as the processed face or breaking of the cores were available after 24 hours of continuous grinding.

Figure 4A:
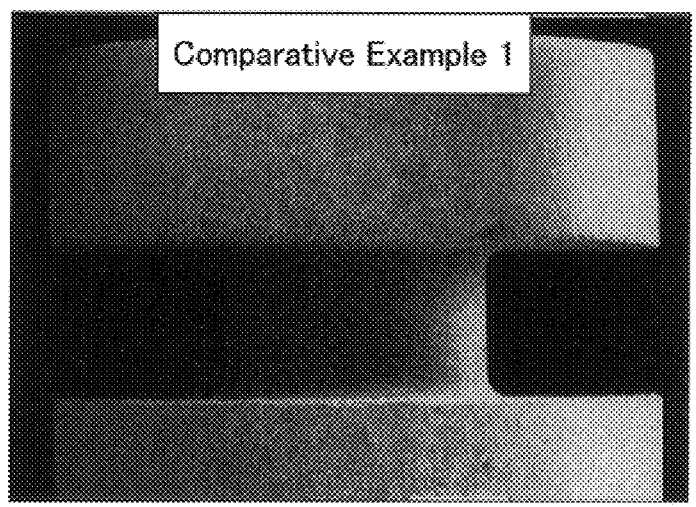
FIGS. 4A to 4C are photographs showing conditions of the drum like cores in Comparative example 1.
Figure 4B:
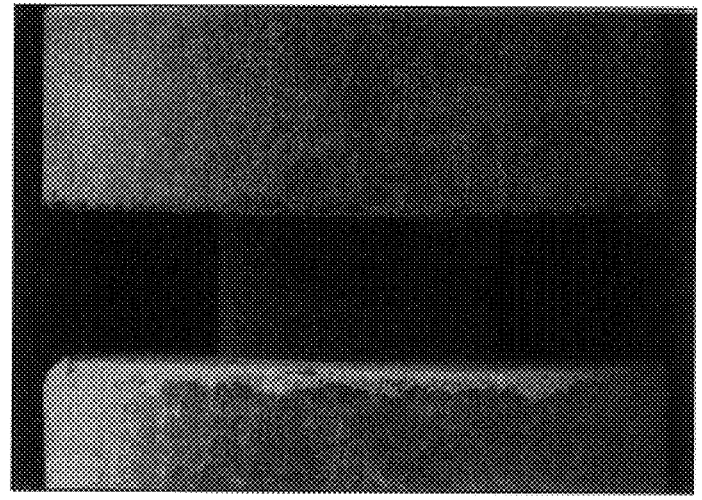
Figure 4C:
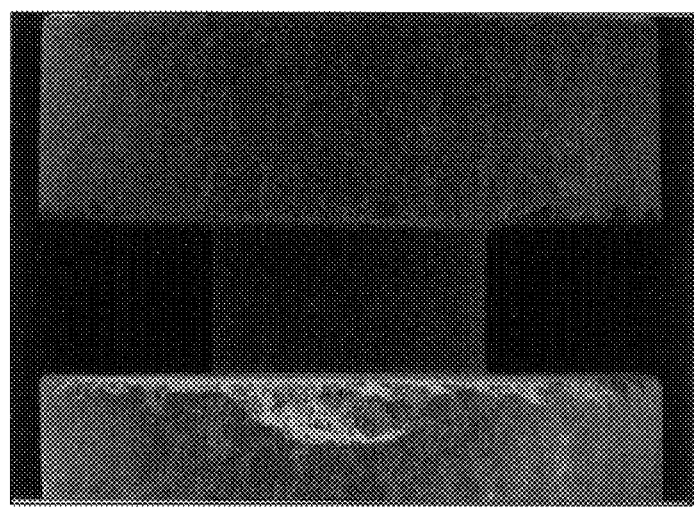

FIG. 4A, B and C are photographs showing conditions of cores by the diamond wheel of grinding the formed bodies by using Comparative example 1 (PVA water solution No. 4) for granulation. FIG. 4A shows the core condition when starting the grinding by the diamond wheel. FIG. 4B shows the core condition after 4 hours of the continuous grinding by the diamond wheel (after continuously grinding 48000 pieces). FIG. 4C shows the core condition after 8 hours of the continuous grinding by the diamond wheel (after continuously grinding 96000 pieces). As confirming from these photographs, defects of the inner brim largely occurred after 4 hours of grinding,. and after 8 hours, large defects were found. Breaking of the cores was in 24 pieces among 48000 pieces.

Figure 5A:
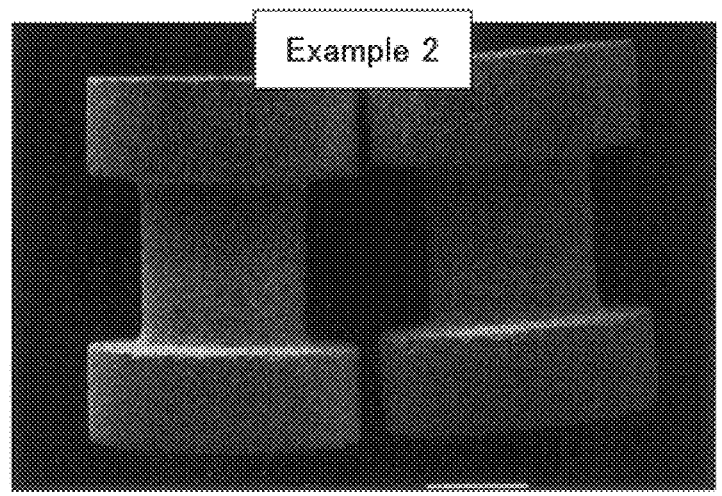
FIGS. 5A to 5C are photographs showing conditions of the drum like cores in Example 2 of the invention.
Figure 5B:
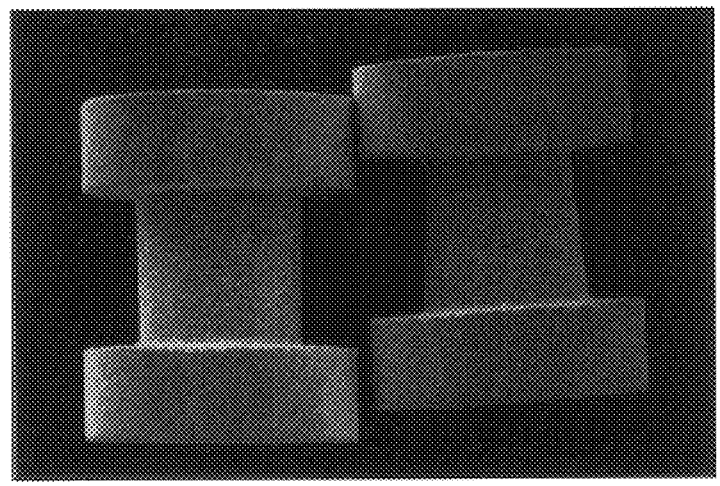
Figure 5C:
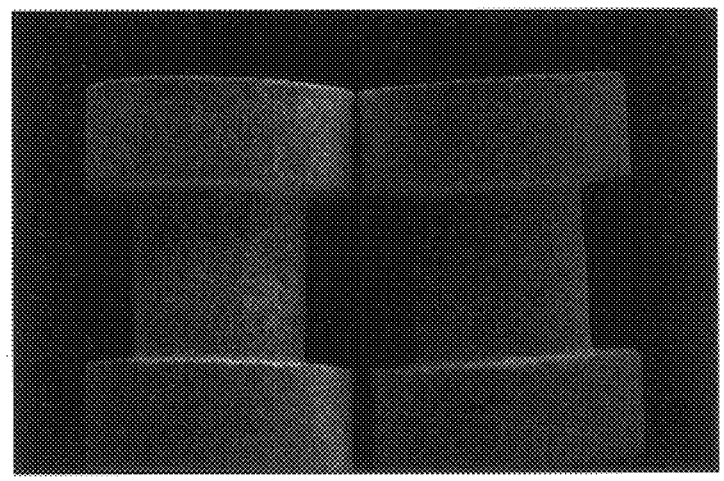

FIG. 5A, B and C are photographs showing. conditions of cores by the diamond wheel of grinding the formed bodies by using. PVA water solution No. 5 for granulation (called as Example 3). FIG. 5A shows the core condition when starting the grinding by the diamond wheel. FIG. 5B shows the core condition after 4 hours of the continuous grinding by the diamond wheel (after continuously grinding 36000 pieces). FIG. 5C shows the core condition after 16 hours of the continuous grinding by the diamond wheel (after continuously grinding 144000 pieces). As confirming from these photographs, according to Example 3, satisfied drum like cores without defects of the inner brim or breaking of the core were available after 16 hours of continuous grinding.

Figure 6A:
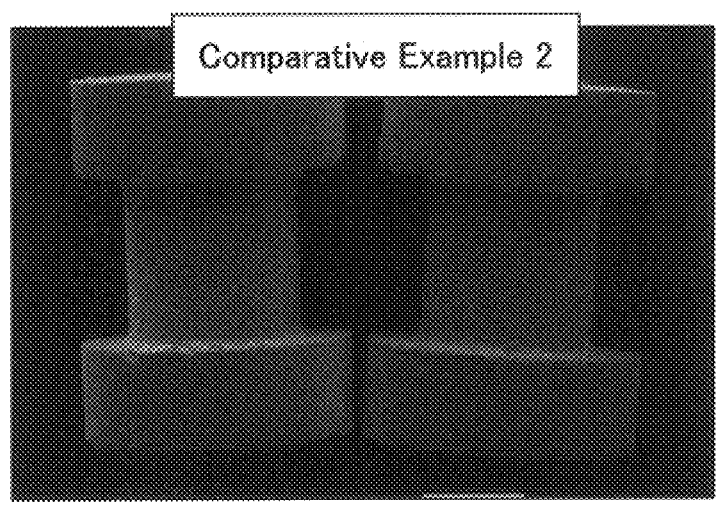
FIGS. 6A to 6C are photographs showing conditions of the drum like cores in Comparative example 2.
Figure 6B:
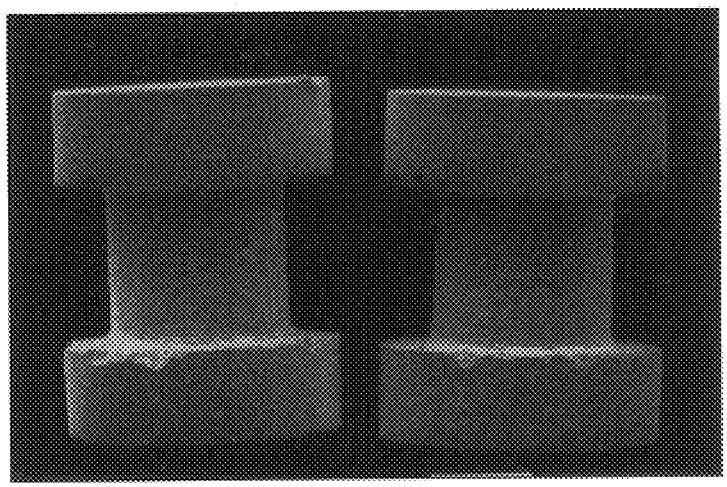
Figure 6C:
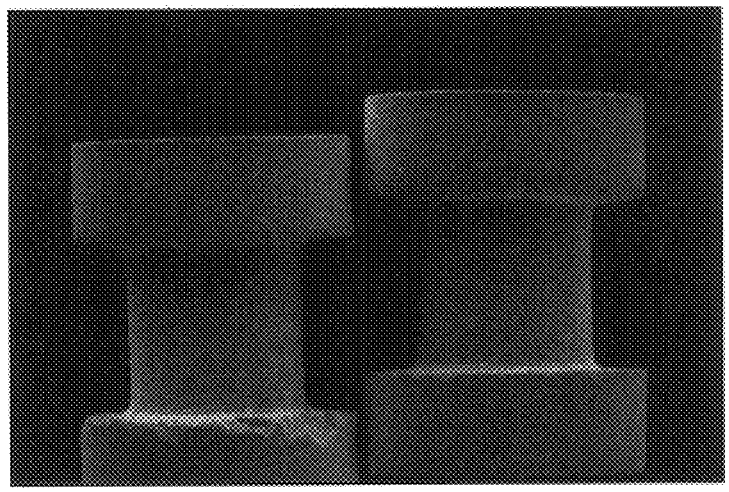

FIG. 6A, B and C are photographs showing conditions of cores by the diamond wheel of grinding the formed bodies by using PVA water solution No. 7 (the polyvinyl alcohol water solution without polyethylene glycol) for granulation. FIG. 6A shows the core conditions when starting the grinding by the diamond wheel. FIG. 6B shows the core conditions after 4 hours of the continuous grinding by the diamond wheel (after continuously grinding 36000 pieces). FIG. 6C shows the core conditions after 4 hours of the continuous grinding by the diamond wheel (after continuously grinding 81000 pieces). As confirming from these photographs, defects of the inner brims largely occurred after 9 hours of grinding, and after 9 hours, large defects were found. Breaking of the core was in 33 pieces among 81000 pieces.

[Evaluation]

(Presence and Absence of Polyethylene Glycol)

Granules was obtained as mentioned above by adding polyethylene glycol as a plasticizer to polyvinyl alcohol, and the ferrite formed body was produced with the granule, and when the formed body was ground by the diamond wheel and the formed body was processed, neither defects of the inner brim nor breakage of core occurred, and the formed body of good workability was obtained.

(Molecular Weight of Polyethylene Glycol)

FIG. 1 shows, as mentioned above, the relation between the density of the formed body and the Vickers hardness together with the workability levels. Numerals given to the respective marks show Nos. of PVA water solutions. When the molecular weight of polyethylene glycol is 1000 as PVA water solutions Nos. 12 and 14, no defects or breakage happen even when the continuous grindings are 100000 or 200000 pieces. On the other hand, with respect to PVA water solutions Nos. 3, 20, 22 of the molecular weight of polyethylene glycol being 600, in No.3, defects appeared at the continuous grinding of 30000 pieces, in No. 20, ground powder dusts began to stick to the cores or the diamond wheel, so that outer appearance was poor and the workability was worsened, and at the same time breakage of 1 to 20 pieces happened, and in No. 22, ground powder dusts stuck to the cores or the diamond wheel at the continuous grinding of 100000 pieces, and breakage happened 20 to 50 pieces. Therefore, it is preferable that the molecular weight of polyethylene glycol is 1000 or more.

In the case of PVA water solution No. 10 of the molecular weight of polyethylene glycol being 6000, no defects or breakage appeared at the continuous grinding of 200000 pieces. However, in the case of PVA water solution No. 11 of the molecular weight of polyethylene glycol being 10000, defects occurred at the continuous grinding of 30000 pieces. From this fact, it is preferable that the molecular weight of polyethylene glycol is 6000 or less.

In PVA water solutions Nos. 1, 2, 5, 6, 8, 10, 12, 15, 21 of the molecular weight of polyethylene glycol being 2000 or 4000 and the addition amount of polyethylene glycol being within a later mentioned range, neither defects nor breakage occurred at 100000 or 200000 pieces, and more preferably the molecular weight ranges 2000 to 4000.

(Addition Amount of Polyethylene Glycol)

In the case of PVA water solution No. 8 of the molecular weight of polyethylene glycol being 2000 and the addition amount to polyvinyl alcohol being 5 wt parts, neither defects nor breakage happened at the continuous grinding of 200000 pieces. However, in the case of PVA water solution No. 9 of the molecular weight of polyethylene glycol being 4000 and the addition amount to polyvinyl alcohol being 3 wt parts, in the case of PVA water solution No. 13 of the molecular weight of polyethylene glycol being 1000 and the addition amount to polyvinyl alcohol being 2 wt parts, and in the case of PVA water solution No. 16 of the molecular weight of polyethylene glycol being 2000 and the addition amount to polyvinyl alcohol being 3 wt parts, defects appeared in all the cases at the continuous grinding of 30000 pieces. Therefore, the addition amount of polyethylene glycol is preferably 5 wt parts or more.

In the cases of PVA water solutions Nos. 18 or 23 of the addition amounts of polyethylene glycol being 50 wt parts, no defects were at 100000 pieces and breakage occurred at 1 to 20 pieces. However, in the cases PVA water solutions Nos. 17 and 19 of addition amounts of polyethylene glycol being 60 wt parts, no defects were at the continuous grinding of 100000 pieces, and breakage increased till 20 to 50 pieces. From this, the addition amount of polyethylene glycol is preferably 50 wt parts or less.

Further, in the case of the molecular weight of polyethylene glycol being 2000 and 4000, and in the case of PVA water solutions Nos. 1, 2, 5, 6 of the addition amount of polyethylene glycol to polyvinyl alcohol being in a range of 20 to 40 wt parts, neither defects of the inner brims nor breakage happened in the continuous grinding of 200000 pieces and ground powder dusts did not stick to the diamond wheel, and so the preferable addition amount of polyethylene glycol is 20 to 40 wt parts.

(Relation Between the Density and the Vickers Hardness of the Formed Body)

In FIG. 1, when the Vickers hardness of the formed body is Y and the density thereof is X (g·cm−3), if the relation between Y and X falls in a range higher than Y=19X−44, defects occur at the continuous grinding of 30000 pieces. If falling in a range lower than Y=19X−56, breakage increases up to 21 to 50 pieces at the continuous grinding of 100000 pieces and ground powder dusts stick to the diamond wheel. Therefore, it is preferable that the formed body ranges from Y=19X−44 or less to Y=19X−56 or more.

The granule for forming ferrite formed body according to the invention is provided by mixing powders of ferrite raw material, polyvinyl alcohol as a binder and polyethylene glycol added as plasticizer and having molecular weight being 1000 to 6000. Therefore, such ferrite formed body may be obtained that abrasion of the processing tools is less, and neither defects nor reduction of precision in the processed face are generated. As a result, frequency of. maintenance such as cleaning of the processing apparatus is fewer, so that yield is improved, quality control is easy, and further examinations of products after processing is unnecessary.

The granule for forming ferrite formed body according to the invention is provided, by adding polyethylene glycol 5 weight parts to 50 weight parts to 100 weight parts of polyvinyl alcohol, whereby the effect of the first aspect is more efficiently accomplished.

The granule for forming ferrite formed body according to the invention is provided by using granules of the above, and when the Vickers hardness of a formed body is Y and the density of the formed body is X (g·cm$^{-3}$) the relation between Y and X is Y=19X−A, and satisfies X=3.0 to 3.9 g·cm$^{-3}$ and A=44 to 56.

Next, second embodiment of the present invention will be explained.

[Adjustment of Granulating Materials]

As shown in Tables 3 and 4, similar to first embodiment, for producing the ferrite sintered products, the granulation depended on the oscillating extrusion granulating method and the spray atomizing granulating method. As materials for performing this granulation, ferrite powder, a water solution of polyvinyl alcohol (PVA) and polyethylene glycol or a water solution of single polyvinyl alcohol were mixed to make a material for granulation.

Herein, PVA water solutions Nos. 5 to 7 depended on the spray atomizing granulation, while others depended on the oscillating extrusion granulation. With respect to the granulates by the oscillating extrusion granulation (other than Nos. 5 to 7), 100 wt parts of Mn—Mg—Zn based ferrite powder were added with 17 wt parts of various polyvinyl alcohol water solutions added or not added with polyethylene glycol, and subjected to mixture—agitation—granulation by an agitation granulating machine TM mixer (made by Mitsui Mining Co., Ltd.) for adjusting granulated powders.

In Table 3, with respect to PVA water solutions Nos. 5 and 6, 69 wt parts of Mn—Mg—Zn based ferrite powder, 25 wt parts of water, 6 wt parts of polyvinyl alcohol water solution added with polyethylene glycol of solid density being 12 wt % and 0.25 wt parts of polycarboxylic acid ammonium salt as a dispersing agent were wet-mixed, and a ferrite slurry was adjusted. PVA water solution No. 7 (spray atomizing granulation) was adjusted in the same ways as PVA water solutions Nos. 5 and 6, excepting that polyethylene glycol was not added.

Herein, as shown in Table 3, the used polyvinyl alcohols were of saponification degree of 98.5 and weight degree of 2400 (PVA water solutions Nos. 1 to 4, 8 to 13 and 17 to 20), saponification degree of 88.0 and weight degree of 500 (PVA water solutions Nos. 5 to 7), and saponification degree of 88.0 and weight degree of 1700 (PVA water solutions Nos. 14 to 16, 21 to 23).

The used polyethylene glycols were molecular weight of 600 (PVA water solutions Nos. 3, 20, 22), molecular weight of 1000 (PVA water solutions Nos. 12 to 14, 23), molecular weight 2000 (PVA water solutions Nos. 1, 6, 8, 15 to 18, 21), molecular weight 4000 (PVA water solutions Nos. 2, 5, 9, 19), molecular weight 6000 (PVA water solutions No. 10), and molecular weight 10000 (PVA water solution No. 11). The addition amounts of polyethylene glycol to 100 wt parts of polyvinyl alcohol were changed as shown at the right column of Table 1.

TABLE 3

| PVA solution No. | Density of solid content (Wt %) | Polyvinyl alcohol Saponification degree | Polyvinyl alcohol Polymerization degree | Polyvinyl alcohol Addition amount (Wt part) | Polyethylene glycol Molecular amount | Polyethylene glycol Addition amount (Wt part) |
|---|---|---|---|---|---|---|
| 1 | 6 | 98.5 | 2400 | 100 | 2000 | 30 |
| 2 | 6 | 98.5 | 2400 | 100 | 4000 | 25 |
| 3 | 6 | 98.5 | 2400 | 100 | 600 | 40 |
| 4 | 6 | 98.5 | 2400 | 100 | — | 0 |
| 5 | 12 | 88.0 | 500 | 100 | 4000 | 20 |
| 6 | 12 | 88.0 | 500 | 100 | 2000 | 25 |
| 7 | 12 | 88.0 | 500 | 100 | — | 0 |
| 8 | 6 | 98.5 | 2400 | 100 | 2000 | 5 |
| 9 | 6 | 98.5 | 2400 | 100 | 4000 | 3 |
| 10 | 6 | 98.5 | 2400 | 100 | 6000 | 10 |
| 11 | 6 | 98.5 | 2400 | 100 | 10000 | 25 |
| 12 | 6 | 98.5 | 2400 | 100 | 1000 | 10 |
| 13 | 6 | 98.5 | 2400 | 100 | 1000 | 2 |
| 14 | 6 | 88.0 | 1700 | 100 | 1000 | 12 |
| 15 | 6 | 88.0 | 1700 | 100 | 2000 | 10 |
| 16 | 6 | 88.0 | 1700 | 100 | 2000 | 3 |
| 17 | 6 | 98.5 | 2400 | 100 | 2000 | 60 |
| 18 | 6 | 98.5 | 2400 | 100 | 2000 | 50 |
| 19 | 6 | 98.5 | 2400 | 100 | 4000 | 60 |
| 20 | 6 | 98.5 | 2400 | 100 | 600 | 25 |
| 21 | 6 | 88.0 | 1700 | 100 | 2000 | 45 |
| 22 | 6 | 88.0 | 1700 | 100 | 600 | 50 |
| 23 | 6 | 88.0 | 1700 | 100 | 1000 | 50 |

[Granulation]

With respect to PVA water solutions Nos. 1 to 4 and 8 to 23, as shown in Table 4, the granulated powders were dried by a belt dryer, extruded by an oscillating granulate cracking machine, and regulated by a shifter, and thus granulates of average diameter. being 250 μm were obtained. In PVA water solutions Nos. 5 to 7, granules were produced by a spray granulating machine, and globule granules of average diameter were 125 μm.

[Measurement of Fluidity]

The fluidity of the obtained granules was measured with respect to time (second/50 g) when the ferrite granules of 50 g were dropped from a funnel specified by JIS Z2502.

[Forming of Granule]

The obtained granules were dry-formed under pressure of 98 MPa respectively to make blocks of 55 mm L×12 mm W×5 mm H. Anti-bending strength of the blocks was measured following the method specified by JIS R1601 by means of a load testing machine (made by Aikoh Engineering Co. Ltd.).

[Sintering of Formed Product]

The obtained granules were dry-formed under pressure of 98 MPa respectively to make ring-like formed products of outer diameter of 21 mm, inner diameter of 12 mm, thickness of 7 mm. Subsequently, the products were sintered at 1300° C. for 2 hours to make ring shaped cores.

[Measurement of Loss of Magnetic Core]

Loss Pcv of the ring shaped magnetic core was measured under conditions of 64 kHz, 50 mT, and 100° C. by means of B—H analyzer (made by Iwatsu Electric Co., Ltd.).

[Measurement of Water Absorption Coefficient]

Water absorption coefficient of the cores was measured by a method following JIS C2141. Namely, the cores to be test pieces were dried at 105 to 120° C., returned to a room temperature in a desiccator, measured in dry mass W1, sunk in a water, boiled and cooled, and removed by wiping off a moisture from surfaces with Gaze. Thus, water saturated test pieces were provided and measured in weight W2, and the water absorption coefficient (%) was obtained by the following formula.

$$\text{Water absorption coefficient} = 100 \times (W2 - W1)/W1$$

The measured results of the loss Pcv of the magnetic core and the water absorption coefficient are shown in Table

TABLE 2

| PVA No. solution | Granulating methods | Fluidization degree (Sec.) | Break resisting strength (MPa) | Water absorption (Wt %) | Pcv (kW/m³) |
|---|---|---|---|---|---|
| 1 | Oscillating extrusion granulation | 26 | 1.5 | 0.05 | 67 |
| 2 | Oscillating extrusion granulation | 26 | 1.6 | 0.07 | 69 |
| 3 | Oscillating extrusion granulation | 30 | 0.9 | 0.01 | 62 |
| 4 | Oscillating extrusion granulation | 25 | 2.1 | 0.23 | 90 |
| 5 | Spray atomizing granulation | 23 | 1.6 | 0.04 | 66 |
| 6 | Spray atomizing granulation | 23 | 1.4 | 0.05 | 68 |
| 7 | Spray atomizing granulation | 22 | 2.0 | 0.24 | 91 |
| 8 | Oscillating extrusion granulation | 25 | 1.8 | 0.19 | 74 |
| 9 | Oscillating extrusion granulation | 25 | 1.9 | 0.21 | 86 |
| 10 | Oscillating extrusion granulation | 26 | 1.7 | 0.16 | 72 |
| 11 | Oscillating extrusion granulation | 26 | 1.1 | 0.21 | 85 |
| 12 | Oscillating extrusion granulation | 25 | 1.7 | 0.14 | 70 |
| 13 | Oscillating extrusion granulation | 24 | 1.9 | 0.22 | 82 |
| 14 | Oscillating extrusion granulation | 26 | 1.7 | 0.09 | 70 |
| 15 | Oscillating extrusion granulation | 25 | 1.6 | 0.13 | 72 |
| 16 | Oscillating extrusion granulation | 24 | 2.0 | 0.21 | 86 |
| 17 | Oscillating extrusion granulation | 28 | 0.7 | 0.01 | 60 |
| 18 | Oscillating extrusion granulation | 27 | 1.2 | 0.01 | 62 |
| 19 | Oscillating extrusion granulation | 28 | 0.7 | 0.01 | 62 |
| 20 | Oscillating extrusion granulation | 29 | 0.9 | 0.03 | 63 |
| 21 | Oscillating extrusion granulation | 26 | 1.4 | 0.04 | 65 |
| 22 | Oscillating extrusion granulation | 31 | 1.0 | 0.03 | 64 |
| 23 | Oscillating extrusion granulation | 27 | 1.3 | 0.06 | 65 |

[Relation Between the Forming Pressure and the Density of the Formed Product]

Figure 7:
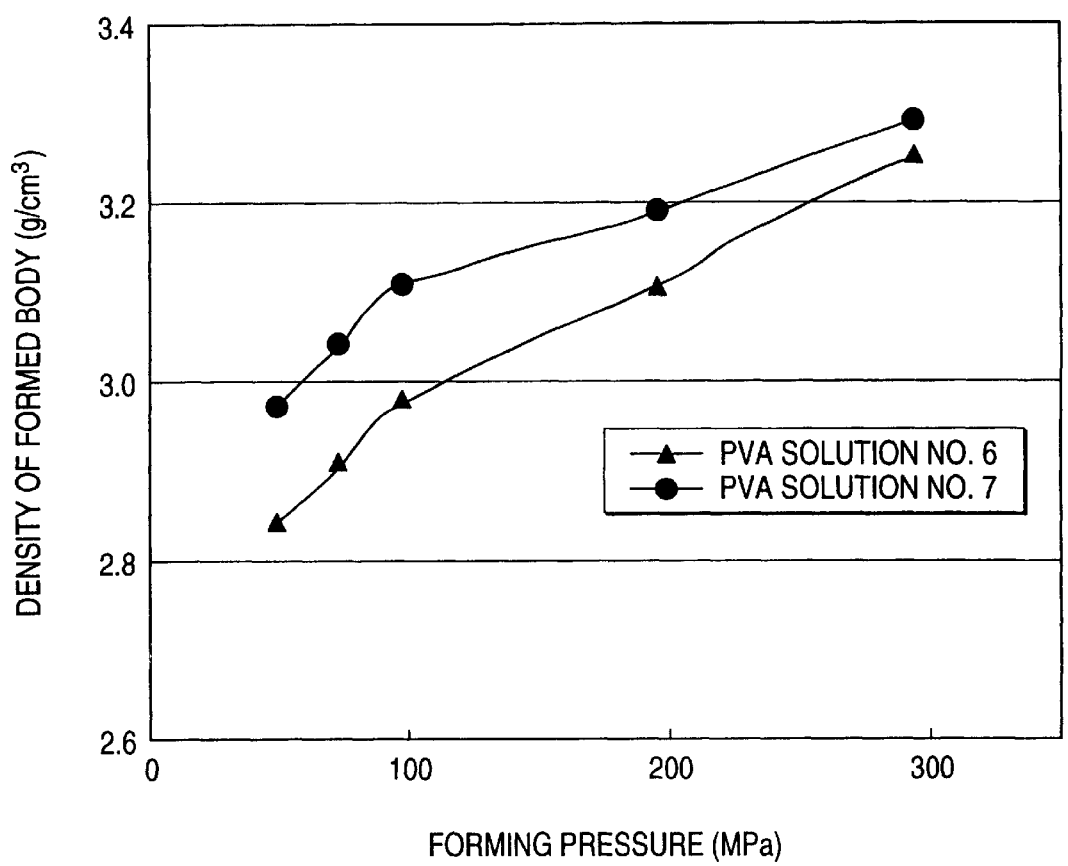
FIG. 7 is a graph showing the relation between the forming pressure and the density of the formed products in Examples and Comparative examples.

The granules of 1.5 g produced with PVA solutions Nos. 6 and 7 were filled in the mold of 6 mm diameter, varied between 49 to 294 MPa of the forming pressure and dry-formed under pressure to produce column shaped ferrite-formed products of 6 mm diameter and 16 to 19 mm length. The results are shown in FIG. 7.

[Photographs of Side Faces]

Figure 8A:
FIGS. 8A to 8F are photographs showing the conditions of the formed products in Examples and Comparative examples.
Figure 8D:
Figure 8B:
Figure 8E:
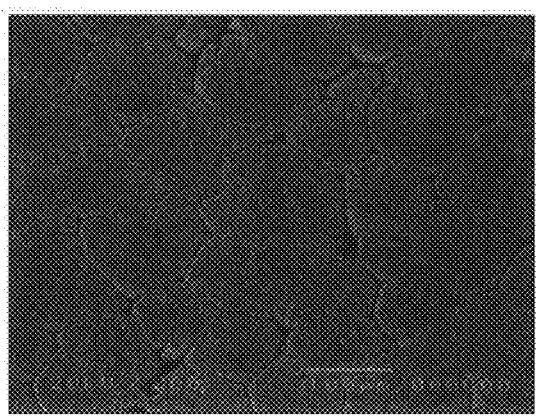
Figure 8C:
Figure 8F:
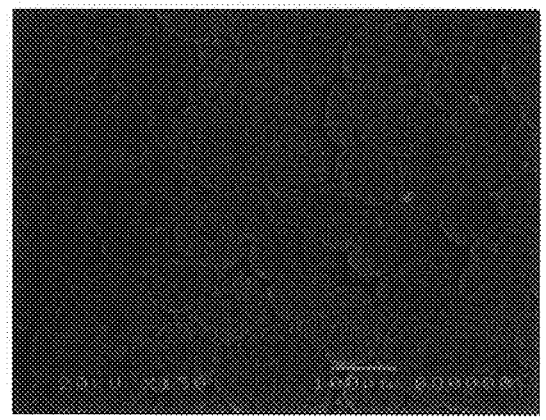

FIGS. 8A to 8F show SEM photographs of results of crushed conditions in the core side faces of the products formed at the pressure of 196 MPa. FIGS. 8A, 8B, and 8C show the respective side faces of the upper, middle and lower parts of the product formed with the granule of PVA water solution No. 6. FIGS. 8D, 8E, and 8F show the respective sides faces of the upper, middle and lower parts of the product formed with the granule of PVA water solution No. 7.

[Evaluation]

(Presence and Absence of Addition of Polyethylene Glycol)

The granule was obtained as mentioned above by adding polyethylene glycol as the plasticizer to polyvinyl alcohol and the ferrite formed body was produced with the granule, so that the ferrite-formed product with less granulate boundary and of high density was obtained. If the formed product is sintered, a sintered material is close and little of vacancy, namely, little of hygroscopic property. Therefore, the ferrite sintered product was largely improved in the loss Pcv of the magnetic core by reduction of defects within the sintered body.

(Molecular Weight of Polyethylene Glycol)

In case the molecular weight of PVA water solutions Nos. 12 and 14, that is, of polyethylene glycol is 1000, the magnetic core loss Pcv is as low as 70, the fluidity is 25 and 26 respectively less than 28 of the preferable fluidity, and the anti-bending strength is both 1.7 and 1.7 more than 1.2 of the preferable anti-bending strength, and both are within the good range.

With respect to PVA water solutions Nos. 3, 20, 22 where the molecular weight of polyethylene glycol is 600, the results were that the magnetic core loss Pcv was preferably low as 62, 63, 64 respectively, but the fluidity was bad as 30, 29, 31, and the anti-bending strength was low as 0.9, 0.9, 1.0. Due to the inferiority of the fluidity, the filling of granule into the mold is made bad and becomes unstable, undesirably resulting in contribution to dispersion of sizes and single weight. Further, the lowering of the anti-bending strength brings about occurrence of cracks. Thus, the molecular weight of polyethylene glycol is preferably 1000 or higher.

In the case of PVA water solution No. 10 of the molecular weight of polyethylene glycol being 6000, it is preferable that the magnetic core loss Pcv is low as 72, the fluidity is 26 and the anti-bending strength is 1.7. However, in the case of PVA water solution No. 11 of the molecular weight of polyethylene glycol being 10000, the magnetic core loss Pcv was high as 85, and.the anti-bending strength was low as 1.1. From this. fact, it is preferable that the molecular weight of polyethylene glycol is 6000 or less.

In PVA water solutions Nos. 1, 2, 5, 6, 8, 10, 12, 15, 21of the molecular weight of polyethylene glycol being 2000 or 4000 and the addition amount of polyethylene glycol being within a predetermined range (5 to 50 wt parts of polyethylene glycol to 100 wt parts of polyvinyl alcohol), the water absorption coefficient is all 0.2% or lower, the magnetic core loss Pcv is all below 72, the fluidity is below 26, and the anti-bending strength is above 1.4, and therefore it is preferable that the molecular weight ranges 2000 to 4000.

(Addition Amount of Polyethylene Glycol)

In the case of PVA water solution No. 8 of the molecular weight of polyethylene glycol being 2000 and the addition amount to polyvinyl alcohol being 5 wt parts, all are within the preferable range as that the magnetic core loss Pcv is low as 74, the fluidity is 25 and the anti-bending strength is 1.8. However, in the case of PVA water solution No.9 of the molecular weight of polyethylene glycol being 4000 and the addition amount to polyvinyl alcohol being 3 wt parts; in the case of PVA water solution No. 13 of the molecular weight of polyethylene glycol being 1000 and the addition amount to polyvinyl alcohol being 2 wt parts; and in the case of PVA water solution No. 16 of the molecular weight of polyethylene glycol being 2000 and the addition amount to polyvinyl alcohol being 3 wt parts, the magnetic core loss Pcv shows high values as 80 or higher in all the cases. Therefore, the addition amount of polyethylene glycol is preferably 5 wt parts or more.

On the other hand, in the cases of PVA water solutions Nos. 18 or 23 of the addition amounts of polyethylene glycol being 50 wt parts, the magnetic core loss Pcv is preferably each low as 62 and 65. Although the anti-bending strength goes down, it is within the allowable range (1.2 or more).

However, in the cases PVA water solutions Nos. 17 and 19 of the addition amounts of polyethylene glycol being 60 wt parts, the magnetic core loss Pcv is preferably low as 60 .and 62, but the anti-bending strength is low as 0.7, resulting in easily generating cracks. From this, the addition amount of polyethylene glycol is preferably 50 wt parts or less.

Further, in the case of the molecular weight of polyethylene glycol being 2000 and 4000, and in the case of PVA water solutions Nos. 1, 2, 5, 6 of the addition amount of polyethylene glycol to polyvinyl alcohol being in a range of 20 to 40 wt parts, the water absorption coefficient is low as below 0.07, the magnetic core loss Pcv is low as below 69, the fluidity is 26 or lower, and the anti-bending strength is 1.4 or higher; and therefore the preferable addition amount of polyethylene glycol is 20 to 40 wt parts.

(Relation Between the Water Absorption Coefficient and the Magnetic Core Loss Pcv)

Figure 9:
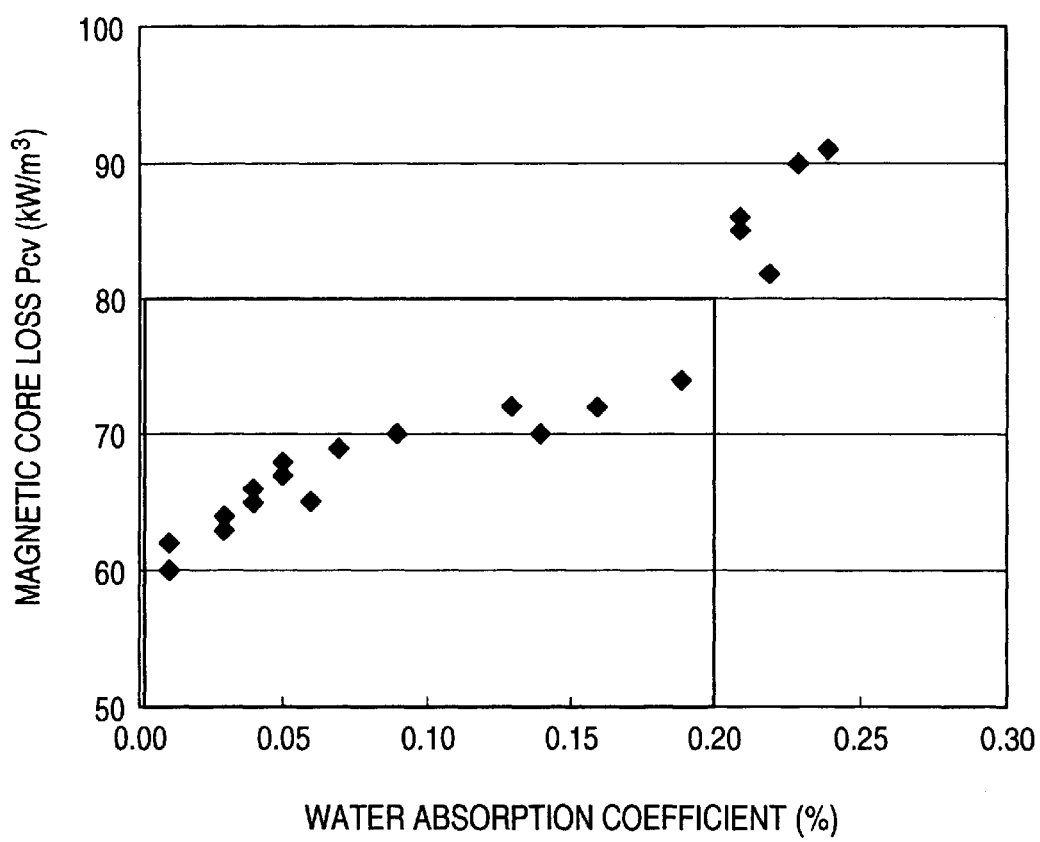
FIG. 9 is a relative diagram showing the relation between the water absorption coefficient and the magnetic core loss of the ferrite sintered products.

FIG. 9 shows, as a scatter diagram, the relation between the water absorption coefficient and the magnetic core loss Pcv of Table 4. It is seen that if the water absorption coefficient is 0.2% or lower, the cores of loss Pcv being 80 kW/m$^3$ or lower can be obtained in the ferrite of the composition of this example. In addition, for obtaining cores of loss Pcv being 70 kW/m$^3$ or lower, it is preferable that the water absorption coefficient is 0.1% or lower.

According to the invention, the ferrite sintered product is obtained by mixing, for granulation, powder of ferrite raw material, polyvinyl alcohol as the binder and polyethylene glycol added as the plasticizer and having molecular weight being 1000 to 6000, and forming and sintering a formed body of the ferrite-forming granule, so that the easy fragility with low pressure is improved, granule boundary of the ferrite formed body is reduced, and thus the ferrite sintered product of the low magnetic core loss may be provided by the reduction of internal defects of the sintered product.

According to the third aspect of the invention, 5 to 50 wt parts of polyethylene glycol are added to 100 wt parts of polyvinyl alcohol in the first and second aspects, so that the effects of the first and second aspects can be more preferably accomplished.

What is claimed is:

1. Granules produced by
   mixing a powder of ferrite raw material, polyvinyl alcohol as a binder, and polyethylene glycol added as a plasticizer and having a molecular weight in a range from 1000 to 6000; and
   granulating the mixture.

2. Granules as set forth in claim 1, wherein 5 to 50 weight parts of polyethylene glycol is added with respect to 100 weight parts of polyvinyl alcohol.

3. Granules as set forth in claim 1, wherein the molecular weight of the polyethylene glycol is in a range from 2000 to 4000.

4. Granules as set forth in claim 1, wherein 20 to 40 weight parts of polyethylene glycol is added with respect to 100 weight parts of polyvinyl alcohol.

5. Granules as set forth in claim 1, wherein 0.2 to 10 weight parts of polyvinyl alcohol is added with respect to 100 weight parts of ferrite raw material.

6. Granules as set forth in claim 1, wherein 0.5 to 3 weight parts of polyvinyl alcohol is added with respect to 100 weight parts of ferrite raw material.

7. Granules as set forth in claim 1, wherein an average particle diameter of the granules is in a range from 50 to 500 $\mu$m.

8. Granules as set forth in claim 1, wherein an average particle diameter of the granules is in a range from 70 to 300 $\mu$m.

9. Granules as set forth in claim 1, wherein an average particle diameter of the granules is in a range from 80 to 150 $\mu$m.

10. A formed body formed using the granules of claim 1, wherein
    the formed body has a Vickers hardness Y and a density X (g·cm$^{-3}$), and
    Y=19X−A when X=3.0 to 3.9 g·cm$^{-3}$ and A=44 to 56.

11. A sintered product produced by
    forming a molded body using the granules of claim 1; and
    sintering the molded body,
    wherein the sintered product has a coefficient of water absorption of 0.2 wt % or lower.

12. A method of producing a sintered product, the method comprising
    molding the granules of claim 1 into a formed body; and
    sintering the formed body to produce the sintered product, wherein
    the sintered product has a coefficient of water absorption of 0.2 wt % or lower.

13. The method as set forth in claim 12, wherein the molding comprises applying a pressure in a range from 40 to 500 MPa to the granules.

14. The method as set forth in claim 2, wherein the molding comprises applying a pressure in a range from 80 to 400 MPa to the granules.

15. A method of making granules, the method comprising
    mixing a powder of ferrite raw material, polyvinyl alcohol and polyethylene glycol;
    granulating the mixture; and
    producing the granules of claim 1.

* * * * *